(12) United States Patent
Hartman (10) Patent No.: US 11,929,935 B2
(45) Date of Patent: Mar. 12, 2024

(54) SYSTEMS AND METHODS TO MAINTAIN TIME SYNCHRONIZATION BETWEEN NETWORKED DEVICES

(71) Applicant: Landis+Gyr Innovations, Inc., Alpharetta, GA (US)

(72) Inventor: James P. Hartman, Monument, CO (US)

(73) Assignee: Landis+Gyr Technology, Inc., Alpharetta, GA (US)

( * ) Notice: Subject to any disclaimer, the term of this patent is extended or adjusted under 35 U.S.C. 154(b) by 0 days.

(21) Appl. No.: 17/187,392

(22) Filed: Feb. 26, 2021

(65) Prior Publication Data
US 2022/0278940 A1 Sep. 1, 2022

(51) Int. Cl.
| H04L 47/52 | (2022.01) |
| H04L 47/62 | (2022.01) |
| H04W 8/04 | (2009.01) |
| H04W 28/14 | (2009.01) |
| H04W 72/0446 | (2023.01) |

(52) U.S. Cl.
CPC ........ *H04L 47/528* (2013.01); *H04L 47/6205* (2013.01); *H04W 8/04* (2013.01); *H04W 28/14* (2013.01); *H04W 72/0446* (2013.01)

(58) Field of Classification Search
CPC ... H04L 47/528; H04L 47/14; H04L 47/6205; H04W 28/14; H04W 72/0446
See application file for complete search history.

(56) References Cited

U.S. PATENT DOCUMENTS

| 2003/0016696 A1* | 1/2003 | Peterson | H04L 29/06 370/466 |
| 2003/0063619 A1* | 4/2003 | Montano | H04L 61/10 370/443 |
| 2006/0268908 A1 | 11/2006 | Wang et al. | |
| 2007/0025391 A1* | 2/2007 | Yonge, III | H04B 3/54 370/465 |
| 2007/0280157 A1 | 12/2007 | Kwon et al. | |
| 2007/0298799 A1* | 12/2007 | Molkdar | H04B 17/391 455/436 |
| 2012/0257639 A1 | 10/2012 | Vijayasankar et al. | |

(Continued)

OTHER PUBLICATIONS

Choudhury et al., A Performance-to-Cost Analysis of IEEE 802.15.4 MAC with 802.15.4e MAC Modes, IEEE Access, vol. 8, Feb. 27, 2020, pp. 41936-41950.

(Continued)

*Primary Examiner* — Stephen J Clawson
(74) *Attorney, Agent, or Firm* — Kilpatrick Townsend & Stockton LLP (57) ABSTRACT

A time synchronization maintenance method includes determining, by a node of a mesh communication network, a transmission time to transmit data in a transmission queue. The method also includes determining, by the node, an amount of time until commencement of a next beacon signal slot used to transmit a time synchronization beacon signal from the node or another node of the mesh communication network. Further, when the transmission time is greater than the amount of time until commencement of the next beacon signal slot, the method includes delaying transmission, by the node, of at least a portion of the data in the transmission queue until completion of the next beacon signal slot.

20 Claims, 7 Drawing Sheets

(56) References Cited

U.S. PATENT DOCUMENTS

| | | | | |
|---|---|---|---|---|
| 2013/0250928 A1* | 9/2013 | Choi | ................ | H04W 72/0446 |
| | | | | 370/337 |
| 2014/0376359 A1* | 12/2014 | Nishikata | ................ | H04W 4/38 |
| | | | | 370/217 |
| 2019/0310308 A1* | 10/2019 | Hess | ................ | G05B 19/4065 |

OTHER PUBLICATIONS

International Application No. PCT/US2022/017380, International Search Report and Written Opinion dated Jun. 3, 2022, 15 pages.
Ramonet et al., IEEE 802.15.4 Now and Then: Evolution of the LR-WPAN Standard, ICACT Transactions on Advanced Communications Technology (TACT), vol. 8, No. 3, May 2019, pp. 1198-1210.

* cited by examiner

| p | b | t | num slots for TX, D | TX time (ms) | superframe length | current slot | EP beacon slot | num slots until EP beacon, C | TX decision |
|---|---|---|---|---|---|---|---|---|---|
| 312 | 50 | 25000 | 2 | 49920 | 1110 | 53 | 55 | 2 | proceed |
| 312 | 100 | 25000 | 1 | 24960 | 1110 | 53 | 55 | 2 | proceed |
| 312 | 200 | 25000 | 1 | 12480 | 1110 | 53 | 55 | 2 | proceed |
| 450 | 50 | 25000 | 3 | 72000 | 1110 | 53 | 55 | 2 | hold off |
| 450 | 100 | 25000 | 2 | 36000 | 1110 | 53 | 55 | 2 | proceed |
| 450 | 200 | 25000 | 1 | 18000 | 1110 | 53 | 55 | 2 | proceed |
| 1000 | 50 | 25000 | 7 | 160000 | 1110 | 53 | 55 | 2 | hold off |
| 1000 | 100 | 25000 | 4 | 80000 | 1110 | 53 | 55 | 2 | hold off |
| 1000 | 200 | 25000 | 2 | 40000 | 1110 | 53 | 55 | 2 | proceed |
| 312 | 50 | 25000 | 2 | 49920 | 1110 | 1387 | 55 | 9778 | proceed |
| 312 | 100 | 25000 | 1 | 24960 | 1110 | 1387 | 55 | 9778 | proceed |
| 312 | 200 | 25000 | 1 | 12480 | 1110 | 1387 | 55 | 9778 | proceed |
| 450 | 50 | 25000 | 3 | 72000 | 1110 | 1387 | 55 | 9778 | proceed |
| 450 | 100 | 25000 | 2 | 36000 | 1110 | 1387 | 55 | 9778 | proceed |
| 450 | 200 | 25000 | 1 | 18000 | 1110 | 1387 | 55 | 9778 | proceed |
| 1000 | 50 | 25000 | 7 | 160000 | 1110 | 1387 | 55 | 9778 | proceed |
| 1000 | 100 | 25000 | 4 | 80000 | 1110 | 1387 | 55 | 9778 | proceed |
| 1000 | 200 | 25000 | 2 | 40000 | 1110 | 1387 | 55 | 9778 | proceed |

FIG. 7

SYSTEMS AND METHODS TO MAINTAIN TIME SYNCHRONIZATION BETWEEN NETWORKED DEVICES

TECHNICAL FIELD

The field of the present disclosure relates to wireless communication between devices. More specifically, the present disclosure relates to techniques used to maintain time synchronization between networked devices.

BACKGROUND

Mesh communication networks may be used in resource metering. For example, network endpoints, such as metering devices, can communicate wirelessly with other nodes or devices included in the mesh communication network. When the mesh communication networks rely on Time Synchronous Channel Hopping (TSCH) techniques for communication, maintaining time synchronization between the devices may be necessary to maintain communication links between devices. For example, time synchronization between the devices may enable the devices to hop to a new communication frequency channel at the same, scheduled time. When time synchronization between two linked devices fails, the devices may not hop to the new communication frequencies at the correct times, which may result in the failure of a communication link between the two linked devices.

To prevent the potential timing desynchronization of the devices, network beacons are periodically transmitted by devices in the mesh communication network. If a device is transmitting data during a beacon time slot, the device may miss a network beacon from another device intended to time synchronize the two devices. Thus, the two devices may quickly fall out of synchronization due to the transmitting device missing the network beacon. Upon falling out of synchronization, a child device may perform a discovery process to generate a new and synchronized relationship with the previous parent device or a new neighboring device. Unnecessary discovery processes may overload the mesh communication network bandwidth, which may have a negative impact on the overall performance of the mesh communication network. Additionally, any child devices of the devices performing the new discovery processes may also be negatively affected while the child devices are not in communication with the mesh communication network.

SUMMARY

Methods for maintaining time synchronization between networked devices are provided. According to various aspects of the present disclosure, a time synchronization maintenance method includes determining, by a node of a mesh communication network, a transmission time to transmit data in a transmission queue. The method also includes determining, by the node, an amount of time until commencement of a next beacon signal slot used to transmit a time synchronization beacon signal from the node or another node of the mesh communication network. Further, when the transmission time is greater than the amount of time until commencement of the next beacon signal slot, the method includes delaying transmission, by the node, of at least a portion of the data in the transmission queue until completion of the next beacon signal slot.

In an additional example, a node of a networked system includes a processor that executes computer-readable instructions and a memory that stores the computer-readable instructions that, when executed by the processor, cause the processor to perform operations. The operations include determining a transmission time to transmit data in a transmission queue. The operations also include determining an amount of time until commencement of a next beacon slot for a time synchronization beacon signal from the node or another node of a mesh communication network. Additionally, when the transmission time is greater than the time until commencement of the next beacon slot, the operations include delaying transmission of at least a portion of the data in the transmission queue until completion of the next beacon slot.

In another example, a non-transitory computer-readable medium has instructions stored thereon that are executable by a processing device to perform operations. The operations include determining a transmission time to transmit data in a transmission queue. The operations also include determining an amount of time until commencement of a next beacon slot for a time synchronization beacon signal from a node of a mesh communication network. Further, when the transmission time is greater than the time until commencement of the next beacon slot, the operations include delaying transmission of at least a portion of the data in the transmission queue until completion of the next beacon slot.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE DRAWINGS

Aspects and features of the various examples will be more apparent by describing examples with reference to the accompanying drawings, in which.

DETAILED DESCRIPTION

While certain examples are described herein, these examples are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Certain aspects and examples of the disclosure relate to maintaining time synchronization between devices of a mesh communication network. The devices or nodes may be components of a mesh communication network associated with resource metering. In such an example, the nodes may be used to provide resource metering information, status information, or other data communications to other devices in the mesh communication network, such as additional metering nodes or a head-end system of the mesh communication network.

When the mesh communication network uses a Time Synchronous Channel Hopping (TSCH) scheme, the devices in the mesh communication network must maintain time synchronization to ensure that the devices hop to the scheduled frequency channels at the appropriate time. To maintain the time synchronization between devices, a time synchronization beacon signal may be transmitted from one device of the mesh communication network to another. A device on the mesh communication network can become desynchronized if the device misses the time synchronization beacon signal. Desynchronization of the device may result in a link with a parent node being lost and necessitate the device undergoing a new neighbor discovery process.

The described examples provide techniques to maintain synchronization of the devices in the mesh communication network. In particular, the techniques ensure that the devices in the mesh communication network schedule data transmissions in a manner that avoids missing the time synchronization beacon signals. For example, the devices in the mesh communication network actively determine transmission lengths of data transmissions and reschedule the data transmissions for time periods that do not overlap with the time synchronization beacon signals.

Figure 1:
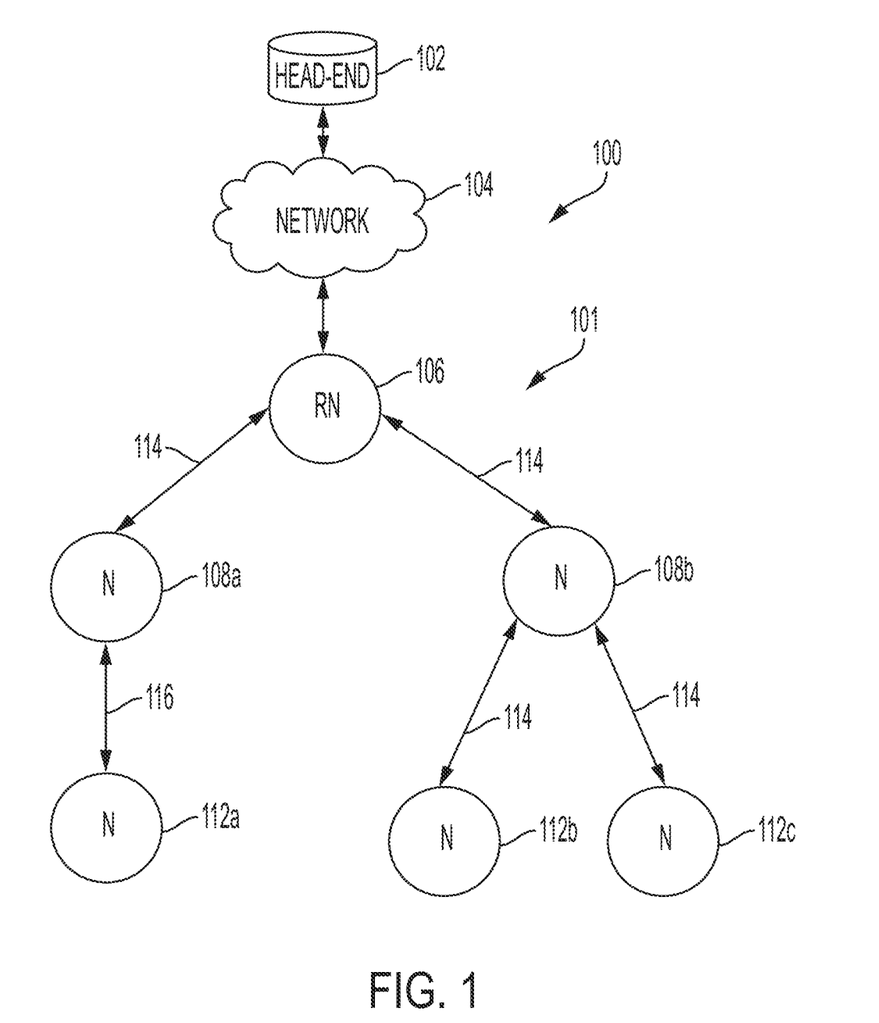
FIG. 1 is a block diagram of a networked system and a mesh communication network of nodes, according to certain examples of the present disclosure.

FIG. 1 is a block diagram illustrating an example of a networked system 100 and a mesh communication network 101 of nodes. The networked system 100 and the mesh communication network 101 provide a network infrastructure for devices (e.g., resource consumption meters, vehicles, home appliances, etc. that include communication technology) to communicate across a network of nodes (i.e., other devices), the internet, and/or an intranet. The networked system 100 includes a head-end system 102, which may function as a central processing system that receives a stream of data from a network 104. The network 104 may be the internet, an intranet, or any other data communication network. The mesh communication network 101 may include a root node 106 that provides a communication path between the network 104 and other nodes 108a and 108b. For example, the root node 106 may collect data from the nodes 108a and 108b and transmit the collected data to the network 104 and ultimately to the head-end system 102 of the networked system 100. The root node 106 may be a personal area network (PAN) coordinator, an internet gateway, or any other device capable of connecting to the network 104. Further, node 112a may communicate with the root node 106 by way of the node 108a, and nodes 112b and 112c may communicate with the root node 106 by way of the node 108b.

The root node 106 may generally be referred to as a parent node due to data links with the nodes 108a and 108b that are located at a node layer (e.g., layer one) below the root node 106. For example, the root node 106 is illustrated as communicating directly with the network 104. As illustrated, nodes 108a and 108b may also be referred to as parent nodes due to data links with the nodes 112a and the nodes 112b and 112c, respectively, which are located at a node layer (e.g., layer two) below the nodes 108a and 108b. The nodes 108a, 108b, 112a, 112b, and 112c may all funnel information up through the node layers to the root node 106, to the network 104, and ultimately to the head-end system 102.

Each of the nodes 106, 108a, 108b, 112a, 112b, and 112c are linked with at least one of the other nodes 106, 108a, 108b, 112a, 112b, and 112c. Communication links 114 may be created between the nodes 106, 108a, 108b, 112a, 112b, and 112c to enable communication between the nodes 106, 108a, 108b, 112a, 112b, and 112c. For example, each of the nodes 106, 108a, 108b, 112a, 112b, and 112c may communicate with each other using wired or wireless communication links 114.

In some examples, the nodes 112a, 112b, and 112c may represent battery endpoints (BEPs) or another type of low-power and lossy endpoints. That is, components of the nodes 112a, 112b, and 112c are powered by a power source other than mains power (e.g., powered by battery power, solar power, wind generated power, etc.). In an example, battery endpoints are used in gas or water metering devices that are not necessarily located within an accessible proximity to a mains power source. The battery endpoints may also be used in electricity metering devices or any other metrology device.

Wireless communications between devices in the mesh communication network 101 can be unreliable due to the unpredictability of the wireless medium. To enhance reliability, a Time Synchronous Channel Hopping (TSCH) scheme may be implemented in the mesh communication network 101 for wireless data transmission. The TSCH scheme may reduce the impact of the wireless medium unpredictability, which enhances the reliability of low power and lossy devices on the mesh communication network 101, such as battery endpoints.

In an example, the TSCH scheme may rely on communication across different frequency channels and different time slots. The mesh communication network 101, and the nodes 106, 108a, 108b, 112a, 112b, and 112c within the mesh communication network 101, may operate using known frequency channel hopping sequences. In other words, the nodes 106, 108a, 108b, 112a, 112b, and 112c are aware of the frequency channel hopping sequences, and the nodes 106, 108a, 108b, 112a, 112b, and 112c are able to shift to appropriate frequency channels at designated time slots.

Communication between the nodes 106, 108a, 108b, 112a, 112b, and 112c may take place on a new radio-frequency channel for each data transmission slot of the TSCH scheme. Thus, the TSCH scheme is highly dependent on reliable time keeping between a child node (e.g., node 112a) and a parent node (e.g., 108a) of the child node. To maintain synchronization, periodic time synchronization beacon signals are transmitted from parent nodes to child nodes. The periodic time synchronization beacon signals may be transmitted during beacon signal slots. The data transmission slots and the beacon signal slots of the TSCH scheme may have the same time length (e.g., 25 ms).

Once a node is synchronized with a parent node, the devices can remain synchronized for a finite amount of time without receiving the periodic time synchronization beacon signal. Upon receiving the periodic time synchronization beacon signal from a parent node, a child node is able to resynchronize with the parent node. If the periodic time synchronization beacon signal is missed by the child node, the child node may lose synchronization with the parent node and require a new neighbor node discovery process to resynchronize the child node with a new parent node or the previous parent node.

In operation, fewer or more nodes may be included in the mesh communication network 101, and more root nodes 106 may also be included in the networked system 100. In an example, the root node 106 may include a Personal Area Network (PAN) size of 1000 nodes. In other words, the root node 106 may support the mesh communication network 101 with 1000 nodes, such as the nodes 108a, 108b, 112a, 112b, and 112c. In such an example, when the time slots for data transmission are 25 ms in length, a synchronization beacon signal time slot may be scheduled for every eleventh slot. If the PAN size is doubled for the root node 106, a frequency offset system may be established. The frequency offset system may assign frequency offsets to half of the nodes for transmitting the periodic time synchronization beacon signal. Assignment of the frequency offsets may enable the number of nodes to double without also doubling the time required for the periodic time synchronization beacon signals.

In some examples, each of the nodes 108a, 108b, 112a, 112b, and 112c are assigned a different beacon signal slot. In other words, every eleventh time slot may be a beacon signal time slot assigned to a different node 108a, 108b, 112a, 112b, or 112c within the mesh communication network 101. To avoid missing the time synchronization beacon signal, the nodes 108a, 108b, 112a, 112b, and 112c may avoid transmitting data during each of the beacon signal time slots of the mesh network 101, during the beacon signal time slots of their parent nodes, if known, or during a combination of the beacon time slots of their parent nodes, if known, and their own beacon signal time slots.

While the mesh communication network 101 depicted in FIG. 1 includes a root node layer (i.e., the root node 106), layer one (i.e., the nodes 108a and 108b), and layer two (i.e., the nodes 112a, 112b, and 112c), fewer or more node layers are also contemplated. Further, while FIG. 1 depicts a specific network topology (e.g., a DODAG tree topology), other network topologies are also possible (e.g., a ring topology, a mesh topology, a star topology, etc.).

Figure 2:
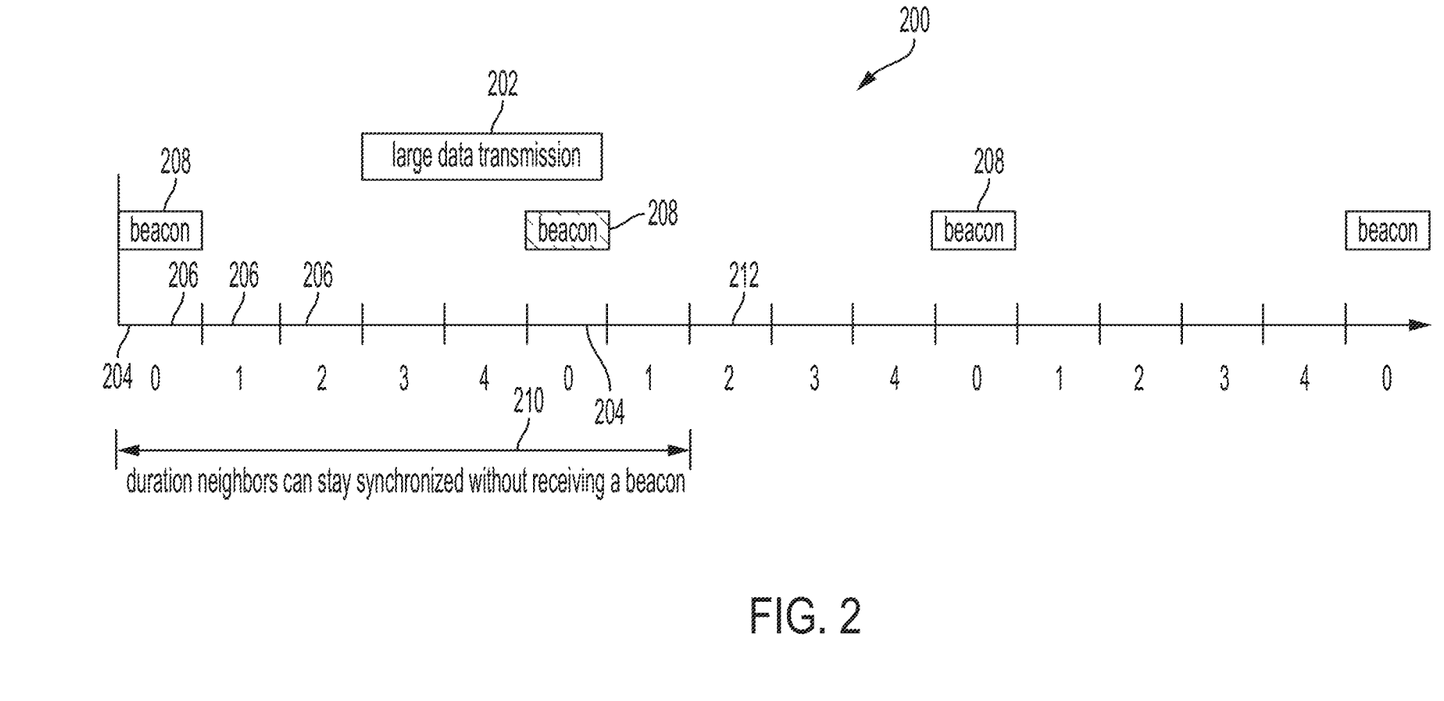
FIG. 2 is a communication time slot chart including a large data transmission that overlaps a beacon time slot, according to certain examples of the present disclosure.

FIG. 2 is a communication time slot chart 200 including a large data transmission 202 that overlaps a beacon time slot 204. The communication time slot chart 200 may represent time slots for the mesh communication network 101. Other nodes 108a, 108b, 112b, and 112c may include similar communication time slot charts. As illustrated, the communication time slot chart 200 includes time slots 206, which are numbered from 0 to 4 to count a number of time slots between the beacon time slots 204. The beacon time slot 204 may be part of the set of time slots 206. For example, the beacon time slot 204 may be at every fifth time slot and include a label of '0.' Time synchronization beacon signals 208 may be transmitted during each of the beacon time slots 204 to maintain synchronization between parent nodes and child nodes.

In an example, the node 112a communicating in the communication time slot chart 200 may be capable of maintaining synchronization with a parent node for a time period 210 of seven time slots 206 before a communication link with the parent node degrades when the communication link is established with a TSCH scheme. To maintain synchronization with the parent node, the node 112a receives the time synchronization beacon signal 208 within the time period 210.

In an example, a large data transmission 202 may be transmitted by the node 112a to neighboring nodes. As illustrated, the large data transmission 202 overlaps with the beacon time slot 204. Due to overlapping of the large data transmission 202 with the time synchronization beacon signal 208, the node 112a may miss the time synchronization beacon signal 208. By missing the time synchronization beacon signal 208, a clock of the node 112a may be so far out of synchronization that it is no longer able to communicate with the parent node at a time slot 212. This loss of synchronization may occur before a subsequent time synchronization beacon signal 208 is received by the node 112a, and the communication link between the node 112a and the parent node may be lost. In losing the communication link, the node 112a may undergo an additional node discovery operation to generate a new communication link with the parent node or an additional node neighboring the node 112a (e.g., the node 108b of FIG. 1).

Figure 3:
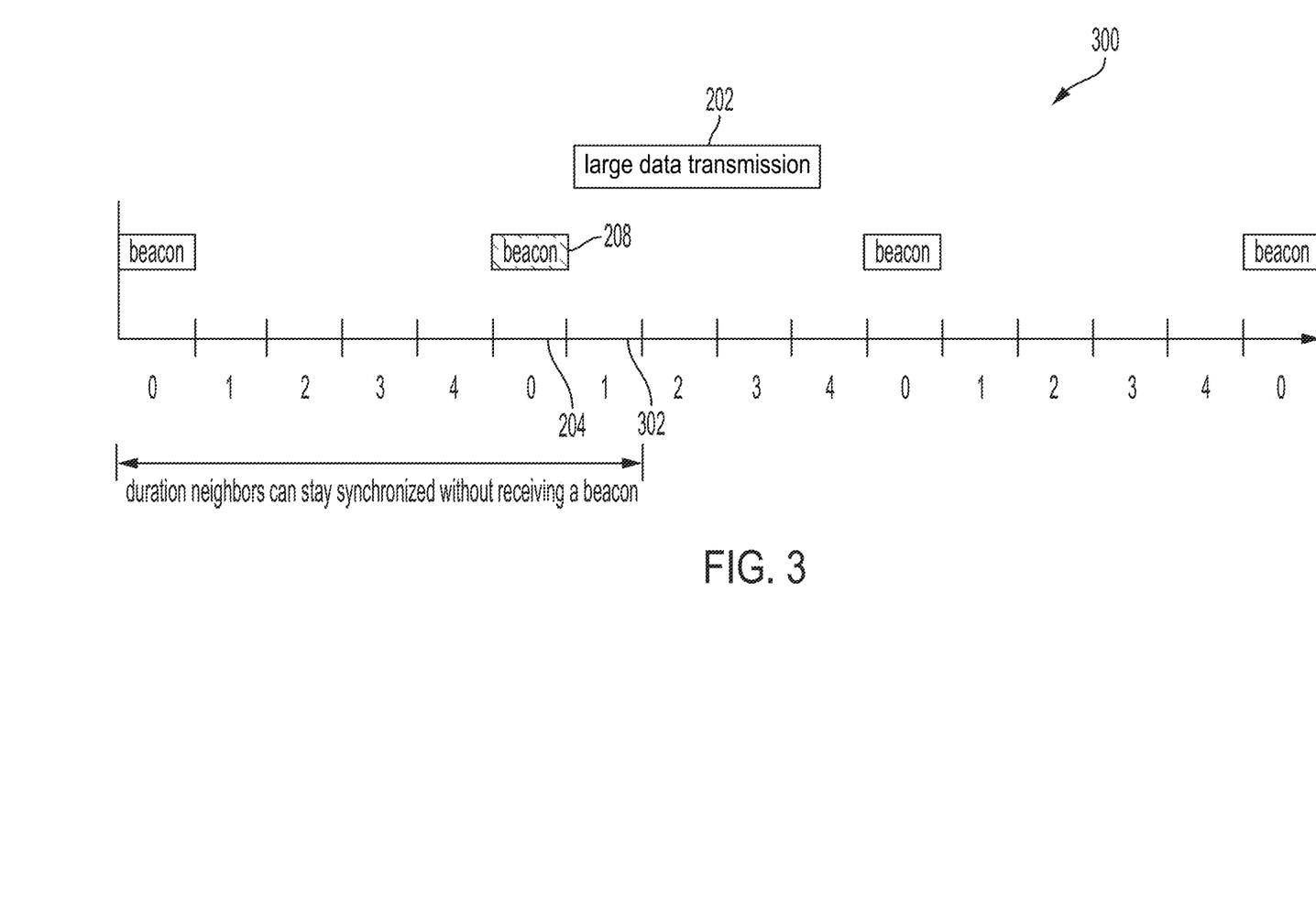
FIG. 3 is a communication time slot chart including the large data transmission of FIG. 2 time shifted to after the beacon time slot, according to certain examples of the present disclosure.

FIG. 3 is a communication time slot chart 300 including the large data transmission 202 time shifted to a time slot 302 that occurs after the beacon time slot 204. In an example, the node 112a may determine that the large data transmission 202 depicted in FIG. 2 cannot be completed prior to the beacon time slot 204. Upon making that determination, the node 112a may not commence transmission of the large data transmission 202 until after the beacon time slot 204 is completed even when a populated time synchronization beacon signal is not populated in the beacon time slot 204 (e.g., when the PAN size of the root node 106 is not completely filled with child nodes).

Figure 4:
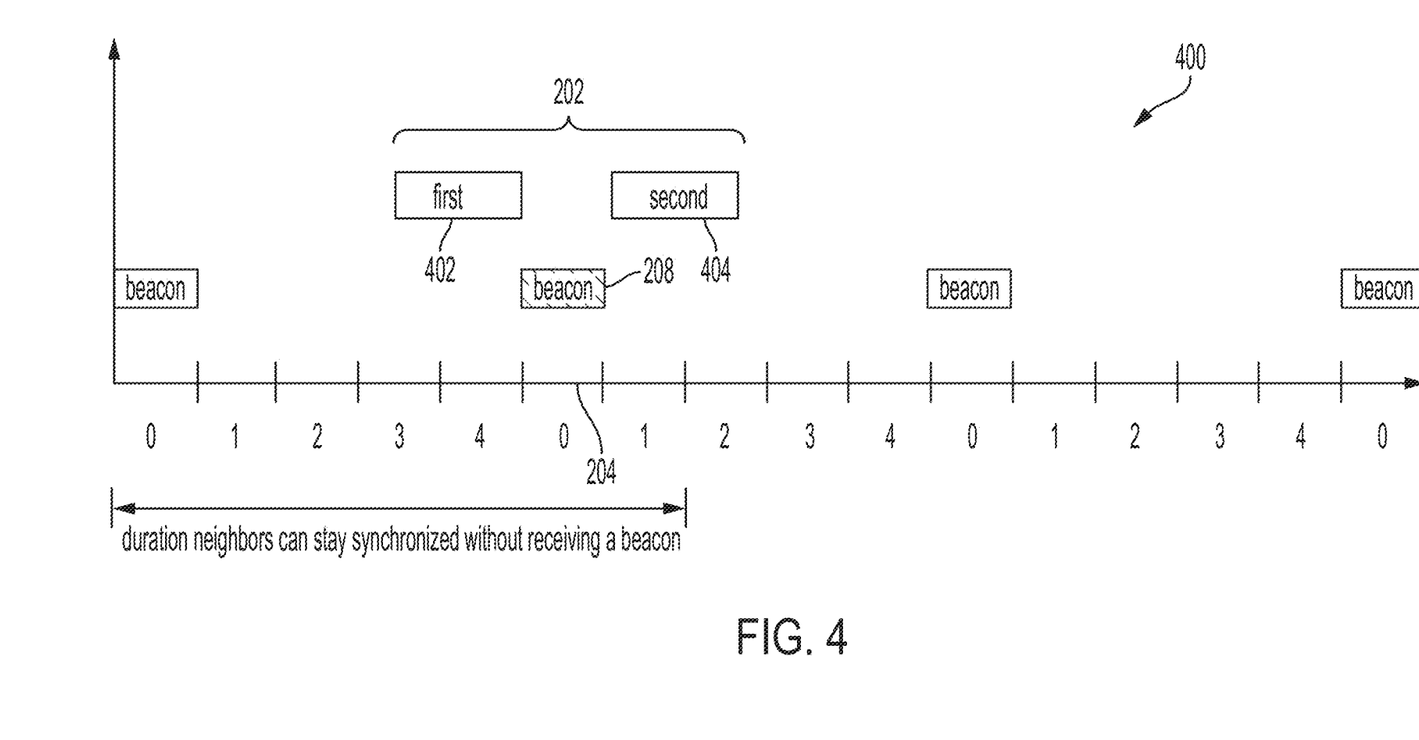
FIG. 4 is a communication time slot chart including the large data transmission of FIG. 2 split between two transmission time slots surrounding the beacon time slot, according to certain examples of the present disclosure.

FIG. 4 is a communication time slot chart 400 including the large data transmission 202 split between two transmission periods 402 and 404 surrounding the beacon time slot 204. In an example, the node 112a may again determine that the large data transmission 202 cannot be completed prior to the beacon time slot 204. Upon making that determination, the node 112a may begin transmission of the large data transmission 202 during the first transmission period 402 prior to the beacon time slot 204, pause transmission during the beacon time slot 204, and recommence transmission of the large data transmission 202 during the second transmission period 404 after the beacon time slot 204. In an additional example, the node 112a may fragment the large data transmission 202 in a manner that a first fragment of the large data transmission 202 is transmitted during the first transmission period 402 and a second fragment of the large data transmission 202 is transmitted during the second transmission period 404.

In either of the communication time slot charts 300 and 400, the node 112a avoids missing the time synchronization beacon signal 208. Accordingly, the node 112a is able to maintain synchronization with a parent node and to transmit the large data transmission 202

Figure 5:
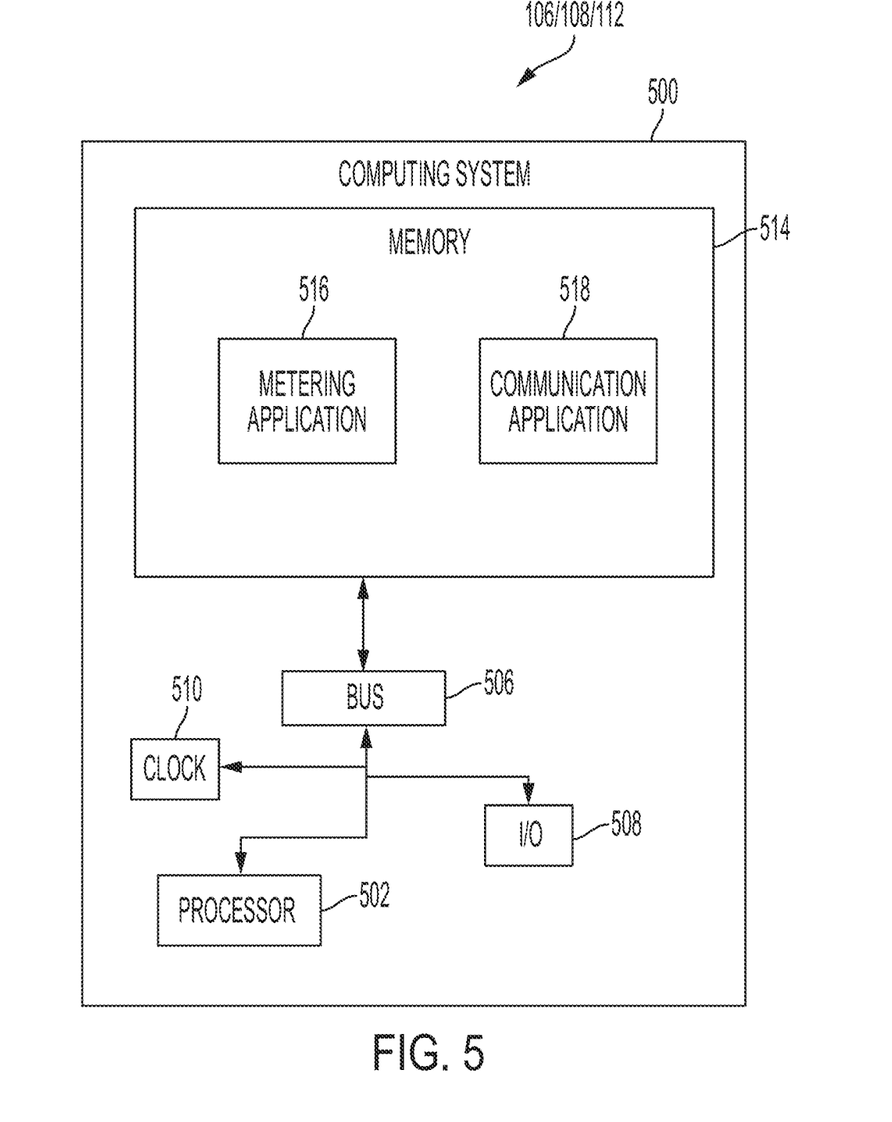
FIG. 5 is an example of a block diagram of a node of the networked system of FIG. 1, in accordance with one or more examples.

FIG. 5 is an example of a block diagram of a node 106, 108, or 112 of the networked system 100, in accordance with one or more examples. Some or all of the components of a computing system 500 can belong to one or more of the nodes 106, 108a, 108b, 112a, 112b, and 112c of FIG. 1. The computing system 500 includes one or more processors 502 communicatively coupled to one or more memory devices 514. The computing system 500 executes program code that configures the processor 502 to perform one or more of the operations described herein. For example, the memory devices 514 may include a metering application 516 (e.g., to control operations of metrology features of the nodes 106, 108a, 108b, 112a, 112b, and 112c) and a communication application 518 (e.g., to control the communications between the nodes 106, 108a, 108b, 112a, 112b, and 112c). The program code of the metering application 516 and the communication application 518, which can be in the form of non-transitory computer-executable instructions, can be resident in the memory device 514 or any suitable computer-readable medium and can be executed by the processor 502. Execution of such program code configures or causes the processor(s) to perform the operations described herein with respect to the nodes 106, 108a, 108b, 112a, 112b, and 112c. While FIG. 5 depicts the metering application 516 stored within the memory devices 514, other applications associated with other actions of the nodes 106, 108a, 108b, 112a, 112b, and 112c may replace the metering application 516 or be added to the metering application 516 depending on the functionality of the nodes 106, 108a, 108b, 112a, 112b, and 112c. Further, the communication application 518 may provide instructions for the nodes 106, 108a, 108b, 112a, 112b, and 112c to implement multiple communication standards including an RF mesh, RF mesh IP, or any other wired or wireless communication standards.

The computing system 500 may also include an input/output ("I/O") interface 508 that can receive input from input devices or provide output to output devices. The interface 508 may include RF antennas capable of transmitting and receiving RF communication from other nodes 106, 108, or 112 in the mesh communication network 101. The computing system 500 may also be able to communicate with one or more other computing devices or computer-readable data sources using the interface 508. Further, the computing system 500 may include a clock 510. The clock 510 is refreshed using the synchronization beacon signals received from a parent node and is used for timing the frequency channel hopping sequences of the TSCH scheme. Additionally, a bus 506 can also be included in the computing system 500. The bus 506 can communicatively couple one or more components of the computing system 500 and allow for communication between such components.

Figure 6:
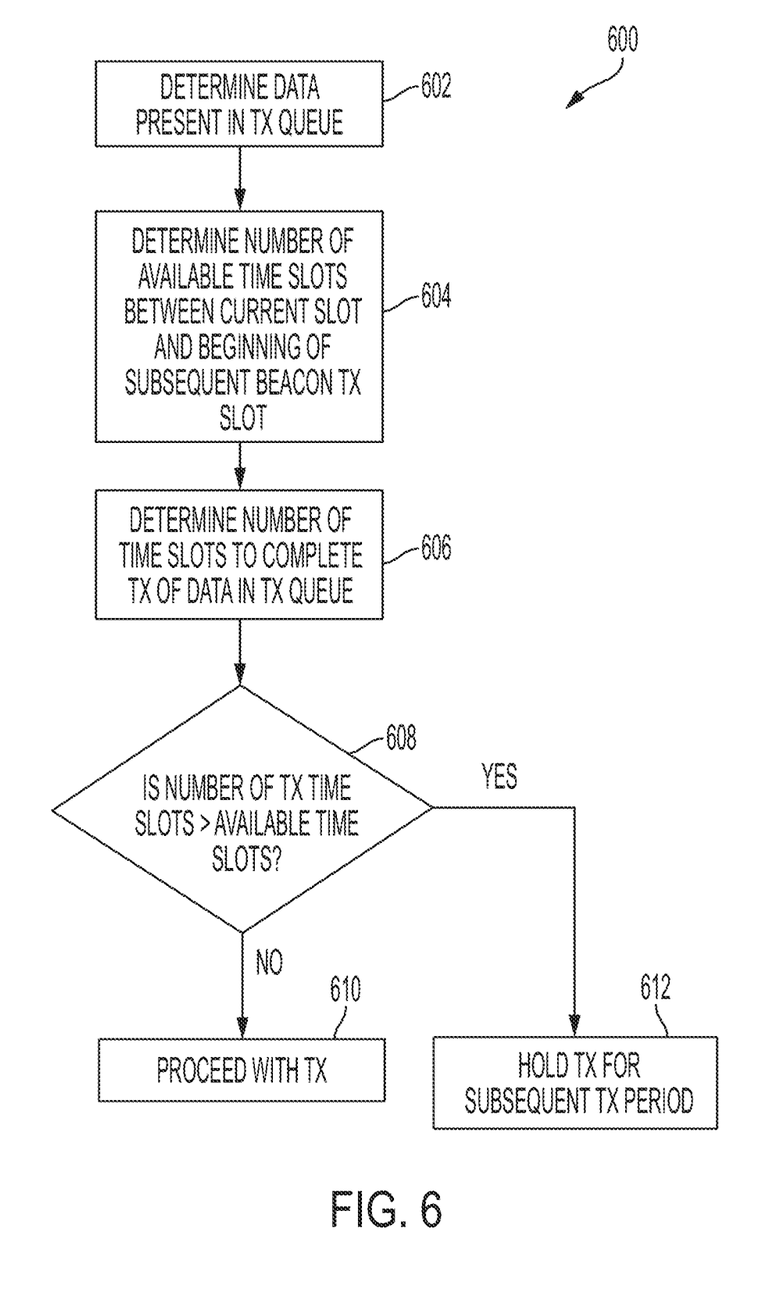
FIG. 6 is a flowchart of a process for maintaining time synchronization between networked devices, according to certain examples of the present disclosure.

FIG. 6 is a flowchart of a process 600 for maintaining time synchronization between networked devices such as two or more of the nodes 106, 108a, 108b, 112a, 112b, and 112c. The process 600 is described below as being performed by the node 112a. However, any of the nodes 106, 108a, 108b, 112a, 112b, and 112c may perform the process 600 in a similar manner. At block 602, the processor 502 of the node 112a determines that data is present in a transmission queue. The data may be metrology data from the metering application 516, communications from parent or child nodes in communication with the node 112a, or any other data received or obtained at the node 112a where transmission is desirable. In an example, the determination that data is present in the transmission queue is made after the start of the current time slot.

At block 604, the processor 502 determines a number of available time slots between a current slot and a beginning of a subsequent beacon transmission slot. For example, the beacon transmission slots may occur after a regular number of transmission time slots. In an example, every eleventh time slot may be a beacon transmission slot. Other beacon transmission slot frequencies may also be available.

If a slot number of the current slot is less than a slot number of the beacon slot, then determining the number of available time slots between the current slot and the beginning of a subsequent or next beacon transmission slot may be performed by subtracting the slot number of the current slot from the slot number of the beacon slot. For example, a slot number of the beacon slot of 55 and a slot number of the current slot of 53 would result in 2 available time slot (e.g., 2=55−53).

If the slot number of the current slot is greater than the slot number of the beacon slot, then determining the number of available time slots between the current slot and the beginning of the subsequent beacon transmission slot may be performed by subtracting the slot number of the current slot from an overall TSCH superframe length and adding the slot number of the beacon slot. For example, an overall superframe length of 11110, a slot number of a current slot of 1387, and a slot number of the beacon slot of 55 would result in 9778 available time slots (e.g., 9778=(11110−1387)+55).

At block 606, the processor 502 determines a number of transmission time slots required to complete the transmission of the data in the transmission queue. The following equation may be used to determine the number of transmission time slots:

$$D = \text{Quotient} \left[ \frac{\frac{p(8)(1000)}{b}}{t} \right] + 1 \quad \text{(Equation 1)}$$

where D is the number of transmission time slots, p is a number of bytes to be transmitted from the data, b is a baud rate used in a communication link to communicate with a destination device, and t is a time slot duration.

At block 608, the processor 502 determines whether a number of transmission time slots determined at block 606 is greater than the number of available times slots determined at block 604. If the number of transmission time slots is not greater than the number of available times slots, then, at block 610, the processor 502 proceeds with transmitting the data from the transmission queue. If the number of transmission time slots is greater than the number of available time slots, then, at block 612, the processor 502 holds the transmission of the data until a subsequent transmission period after the subsequent beacon transmission slot. In some examples, the processor 502, at block 612, may also divide the transmission into a first fragment and a second fragment for transmission of portions of the data before and after the beacon transmission slot.

Figure 7:
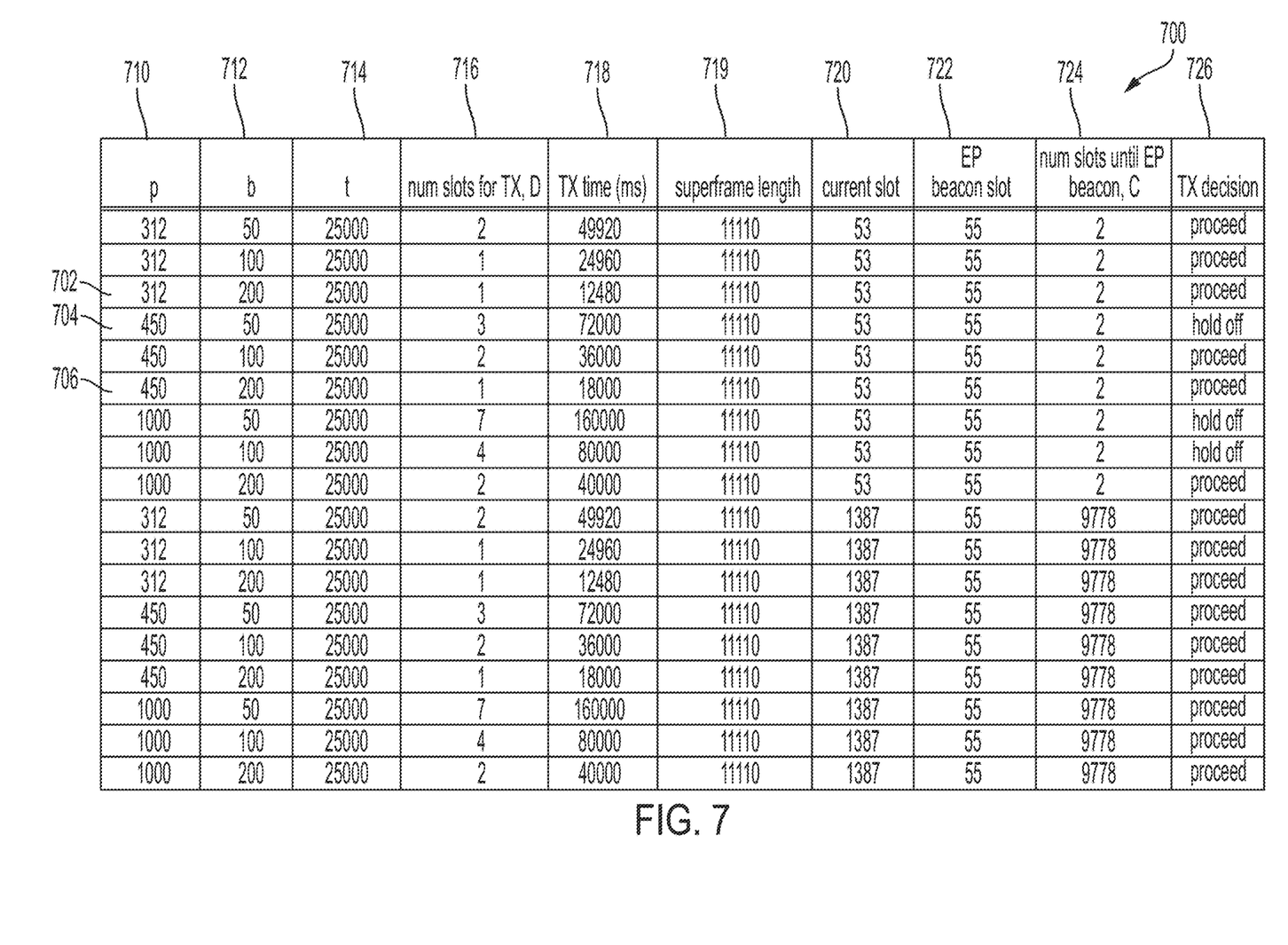
FIG. 7 is a chart of data transmission examples using the process of FIG. 6, according to certain examples of the present disclosure.

FIG. 7 is a chart 700 of data transmission examples using the process 600, according to certain examples of the present disclosure. Each row of the chart 700 represents a different example for transmission of data using the techniques described above. A first column 710 indicates a number of bytes p necessary to transmit the data. A second column 712 indicates a baud rate b in kbps used to transmit the data using a particular communication link. A third column 714 indicates a time t in milliseconds (ms) for time slot duration. A fourth column 716 indicates a number of transmission time slots D needed to transmit the data. A fifth column 718 indicates a transmission time in ms for transmitting the data. A sixth column 719 indicates a TSCH superframe length. A seventh column 720 indicates a current slot number. An eighth column 722 indicates a beacon signal slot number for the node performing the transmission. A ninth column 724 indicates a number of time slots until the beginning of the beacon signal time slot of the node. A tenth column 726 indicates a transmission decision as to whether the node should proceed with transmitting the data or hold off on transmitting the data based on the process 600 described above with respect to FIG. 6.

In a first example 702, the number of available time slots between a current slot and the beginning of the subsequent beacon transmission slot is determined by subtracting the slot number of the current slot (e.g., 53) from the slot number of the beacon slot (e.g., 55). This results in the number of available time slots 'C' being 2. The number of time slots needed to transmit the data is then determined using Equation 1, as provided above. The result is the number of transmission time slots 'D' being 1, which is less than the number of available time slots 'C.' Accordingly, the transmission of the data can proceed immediately.

In a second example 704, the number of available time slots 'C' remains 2. The number of bytes for transmission has increased and the baud rate has decreased. Accordingly, the data to be transmitted is larger than in example 1 and is also transmitted at a slower rate (e.g., due to a lower transmission frequency of the TSCH scheme). Because of this, the number of transmission time slots 'D' is 3, which is greater than the number of available time slots 'C.' Accordingly, the transmission of the data is placed on hold until after the subsequent beacon transmission slot, or the data is fragmented for transmission during time periods surrounding the subsequent beacon transmission slot.

In a third example 706, the number of available time slots 'C' remains 2. The number of bytes for transmission is the same as in the second example 704 and the baud rate has increased from the second example 704. Accordingly, the data to be transmitted is the same size as the second example 704 and is transmitted at a faster rate (e.g., due to a higher transmission frequency of the TSCH scheme). Because of this, the number of transmission time slots 'D' is 1, which is less than the number of available time slots 'C.' Accordingly, the transmission of the data can proceed immediately.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

That which is claimed is:

1. A time synchronization maintenance method, comprising:
    transmitting, in a first beacon signal slot, a first time synchronization beacon signal from a first node of a mesh communication network;
    determining, by a second node of the mesh communication network, a transmission time to transmit data in a transmission queue, wherein the second node is a same node as the first node or is another node of the mesh communication network;
    determining, by the second node, an amount of time until commencement of a second beacon signal slot used to transmit a second time synchronization beacon signal from the second node or a second another node of the mesh communication network, wherein the amount of time is less than a time period between the first beacon signal slot and the second beacon signal slot; and
    determining by the second node, that the transmission time amount is greater than the amount of time until commencement of the second beacon signal slot;
    fragmenting, by the second node, the data into a first portion and a second portion, wherein a transmission time to transmit the first portion is less than the amount of time until commencement of the second beacon signal slot;
    transmitting, by the second node, the first portion of the data;
    pausing transmission, by the second node, of the data in the transmission queue until completion of the second beacon signal slot; and
    transmitting, by the second node, the second portion of the data after the completion of the second beacon signal slot.

2. The method of claim 1, wherein the second beacon signal slot comprises a parent beacon signal slot in which a parent node of the second node of transmits the time synchronization beacon signal.

3. The method of claim 1, wherein determining the transmission time amount to transmit the data in the transmission queue comprises:
    identifying a baud rate of a current communication link of the second node;
    detecting a number of bytes in the data; and
    dividing the number of bytes in the data by the baud rate.

4. The method of claim 1, wherein the time synchronization beacon signal is configured to maintain time synchronization between a set of nodes of the mesh communication network.

5. The method of claim 1, wherein delaying transmission, by the second node, of at least the portion of the data in the transmission queue until completion of the second beacon signal slot comprises: transmitting, by the second node, at least a second portion of the data in the transmission queue prior to the second beacon signal slot.

6. The method of claim 1, wherein the data comprises metrology data collected by the second node or by a child of the second node.

7. The method of claim 1, further comprising:
    determining, by the second node of the mesh communication network, a second transmission time amount to transmit second data in the transmission queue;
    determining, by the second node, a second amount of time until commencement of a third beacon signal slot used to transmit the time synchronization beacon signal from the second node or the second another node of the mesh communication network;
    determining, by the second node, that the second transmission time amount is less than the second amount of time until commencement of the third beacon signal slot; and
    transmitting, by the second node, at least a second portion of the data in the transmission queue prior to the second beacon signal slot.

8. The method of claim 1, wherein the second node comprises a metrology device configured to meter consumption of electricity, water, or natural gas.

9. The method of claim 1, wherein transmitting the data in the transmission queue is performed using a Time Synchronous Channel Hopping (TSCH) scheme, and wherein the mesh communication network is established using RF mesh or RF mesh IP standards.

10. A node of a networked system, comprising:
    a processor configured to execute computer-readable instructions; and
    a memory configured to store the computer-readable instructions that, when executed by the processor, cause the processor to perform operations comprising:
        transmitting, in a first beacon slot, a first time synchronization beacon signal;

determining a transmission time to transmit data in a transmission queue;

determining an amount of time until commencement of a second beacon slot for a time synchronization beacon signal from the node or another node of a mesh communication network, wherein the amount of time is less than a time period between the first beacon slot and the second beacon slot; and determining that the transmission time amount is greater than the amount of time until commencement of the second beacon slot;

fragmenting the data into a first portion and a second portion, wherein a transmission time to transmit the first portion is less than the amount of time until commencement of the second beacon slot;

transmitting the first portion of the data;

pausing transmission of the data in the transmission queue until completion of the second beacon slot; and transmitting the second portion of the data after the completion of the second beacon slot.

11. The node of claim 10, wherein the second beacon slot comprises a parent beacon slot in which a parent node of the node transmits the time synchronization beacon signal.

12. The node of claim 10, wherein the operation of determining the transmission time amount to transmit the data in the transmission queue comprises:

identifying a baud rate of a current communication link of the node;

detecting a number of bytes in the data; and dividing the number of bytes in the data by the baud rate.

13. The node of claim 10, wherein the time synchronization beacon signal is configured to maintain time synchronization between a set of nodes of the mesh communication network.

14. The node of claim 10, further comprising:

a radio configured to communicate with the mesh communication network; and a metrology device in communication with the radio.

15. The node of claim 14, wherein the metrology device is configured to meter consumption of electricity, water, or natural gas, and wherein the data in the transmission queue comprises metrology data from the metrology device.

16. A non-transitory computer-readable medium having instructions stored thereon, the instructions executable by a processing device to perform operations comprising:

transmitting, in a first beacon slot, a first time synchronization beacon signal from a node of a mesh communication network;

determining a transmission time amount to transmit data in a transmission queue;

determining an amount of time until commencement of a second beacon slot for a time synchronization beacon signal from the node or another node of the mesh communication network, wherein the amount of time is less than a time period between the first beacon slot and the second beacon slot;

determining that the transmission time amount is greater than the amount of time until commencement of the second beacon slot;

fragmenting the data into a first portion and a second portion, wherein a transmission time to transmit the first portion is less than the amount of time until commencement of the second beacon slot;

transmitting the first portion of the data;

pausing transmission of the data in the transmission queue until completion of the second beacon slot; and transmitting the second portion of the data after the completion of the second beacon slot.

17. The non-transitory computer-readable medium of claim 16, wherein the second beacon slot comprises a parent beacon slot in which a parent node of the node transmits the time synchronization beacon signal.

18. The non-transitory computer-readable medium of claim 16, wherein the operation of pausing transmission of at least the portion of the data in the transmission queue until completion of the second beacon slot comprises:

transmitting at least a second portion of the data in the transmission queue prior to the second beacon slot.

19. The non-transitory computer-readable medium of claim 16, wherein the instructions are further executable by the processing device to perform operations comprising:

determining a second transmission time amount to transmit second data in the transmission queue;

determining a second amount of time until commencement of a third beacon signal slot used to transmit the time synchronization beacon signal from the node or another node of the mesh communication network;

determining that the second transmission time amount is less than the second amount of time until commencement of the third beacon signal slot; and transmitting the data in the transmission queue prior to the second beacon slot.

20. The non-transitory computer-readable medium of claim 16, wherein the data comprises metrology data collected by a node comprising the non-transitory computer-readable medium or by a child of the node.

\* \* \* \* \*